(12) United States Patent
Waalkes et al.

(10) Patent No.: US 6,279,727 B1
(45) Date of Patent: Aug. 28, 2001

(54) BELT CLEANER APPARATUS

(75) Inventors: Jon Robert Waalkes, Grand Rapids; Dennis L. Gleason, Kentwood, both of MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 09/599,814

(22) Filed: Jun. 21, 2000

Related U.S. Application Data

(63) Continuation of application No. PCT/US98/27290, filed on Dec. 22, 1998.
(60) Provisional application No. 60/068,642, filed on Dec. 23, 1997.

(51) Int. Cl.[7] .................................................. B65G 45/00
(52) U.S. Cl. ............................................................. 198/499
(58) Field of Search ............................................. 198/499

(56) References Cited

U.S. PATENT DOCUMENTS

| | | |
|---|---|---|
| 3,952,863 | 4/1976 | Schattauer . |
| 3,994,388 * | 11/1976 | Reiter . |
| 4,105,109 * | 8/1978 | Schultz . |
| 4,694,952 * | 9/1987 | Meijer . |
| 4,838,409 | 6/1989 | Rappen . |
| 5,213,197 | 5/1993 | Mohri . |
| 5,372,244 * | 12/1994 | Morin . |
| 5,518,107 * | 5/1996 | Schwarze . |
| 5,611,524 * | 3/1997 | Gordon . |
| 5,797,477 * | 8/1998 | Veenhof . |
| 5,975,281 * | 11/1999 | KYoshizako et al. ............... 198/499 |
| 6,041,913 * | 3/2000 | Dolan .................................. 198/499 |
| 6,076,656 * | 6/2000 | Mat ..................................... 198/499 |

FOREIGN PATENT DOCUMENTS

| | | |
|---|---|---|
| 2116581 | 3/1993 | (CA) . |
| 39 08 873 A1 | 11/1989 | (DE) . |
| 2 125 357 | 3/1984 | (GB) . |
| 2 165 200 | 4/1986 | (GB) . |
| WO 97/14635 | 4/1997 | (WO) . |

* cited by examiner

*Primary Examiner*—Christopher P. Ellis
*Assistant Examiner*—Joe Dillon, Sr.
(74) *Attorney, Agent, or Firm*—Fitch, Even, Tabin & Flannery

(57) ABSTRACT

A conveyor belt cleaning apparatus with an elastomeric biasing means. Some given number of the apparatus are seated on a horizontal mount which spans the width of a conveyor belt. Each unit is hollow. This void is loaded with filler material. A metallic blade seat is integral with the elastomeric material and configured to accept a blade.

28 Claims, 5 Drawing Sheets

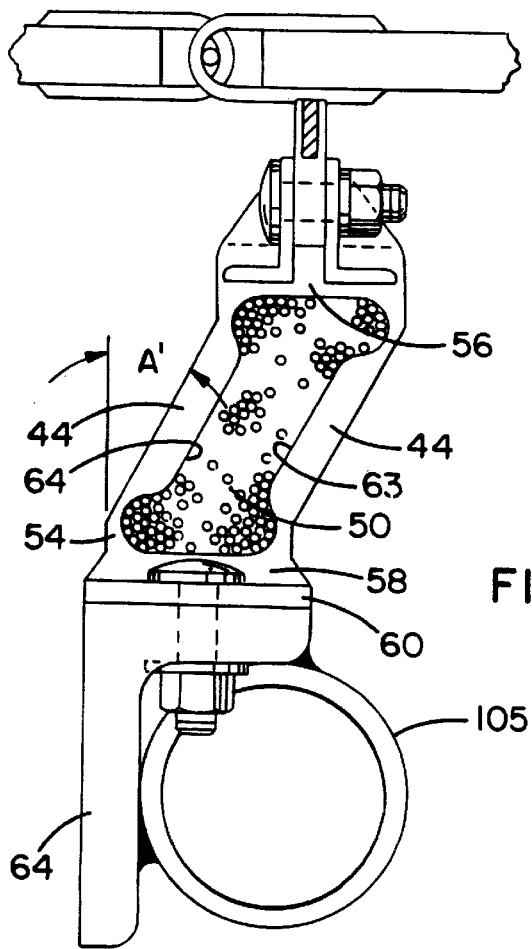
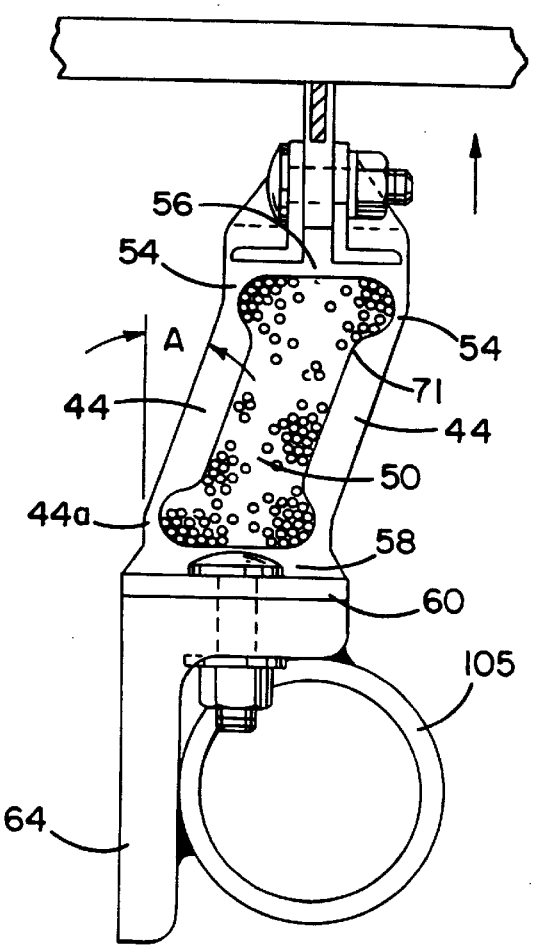
FIG. 2B
FIG. 2C

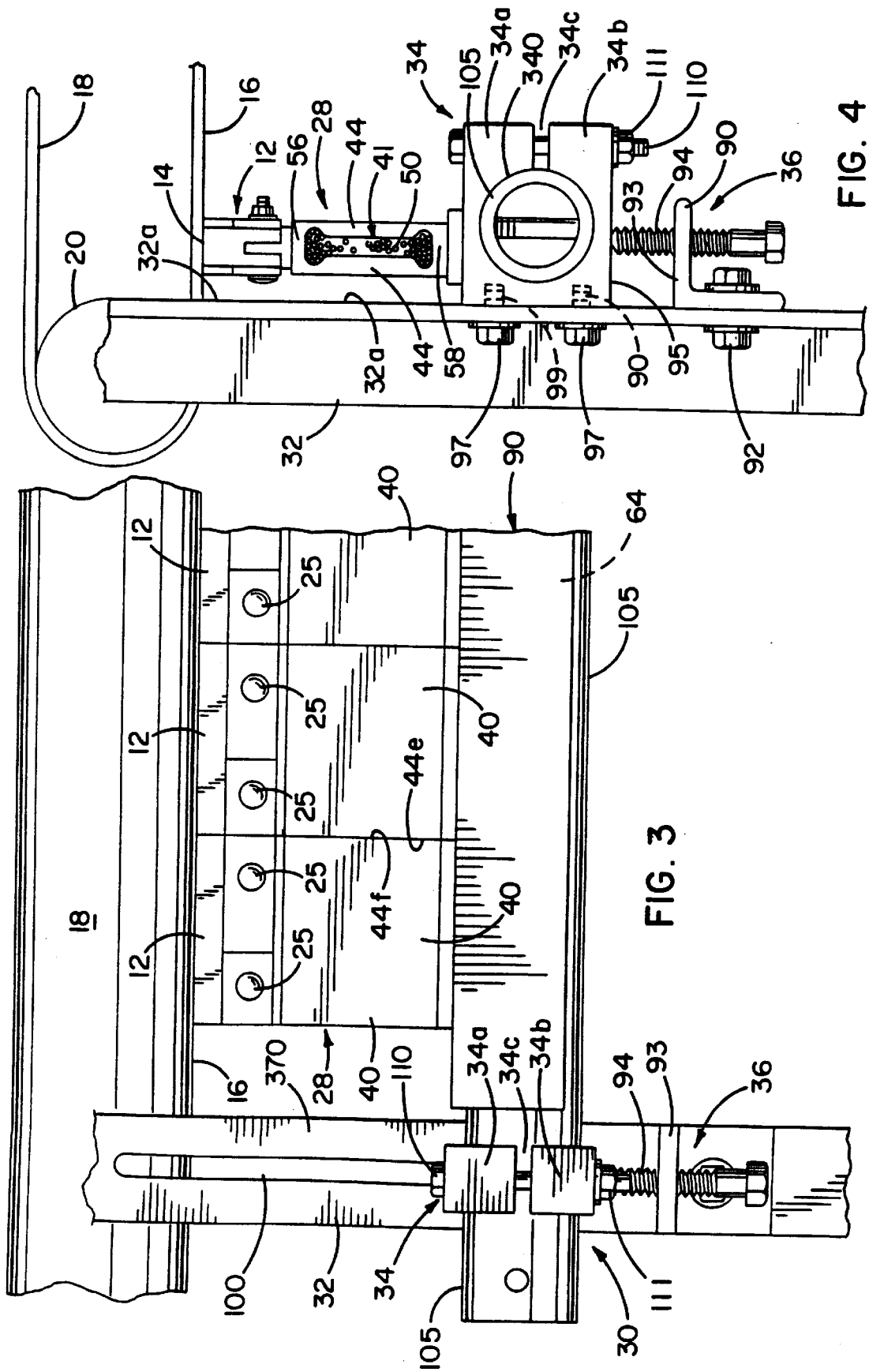

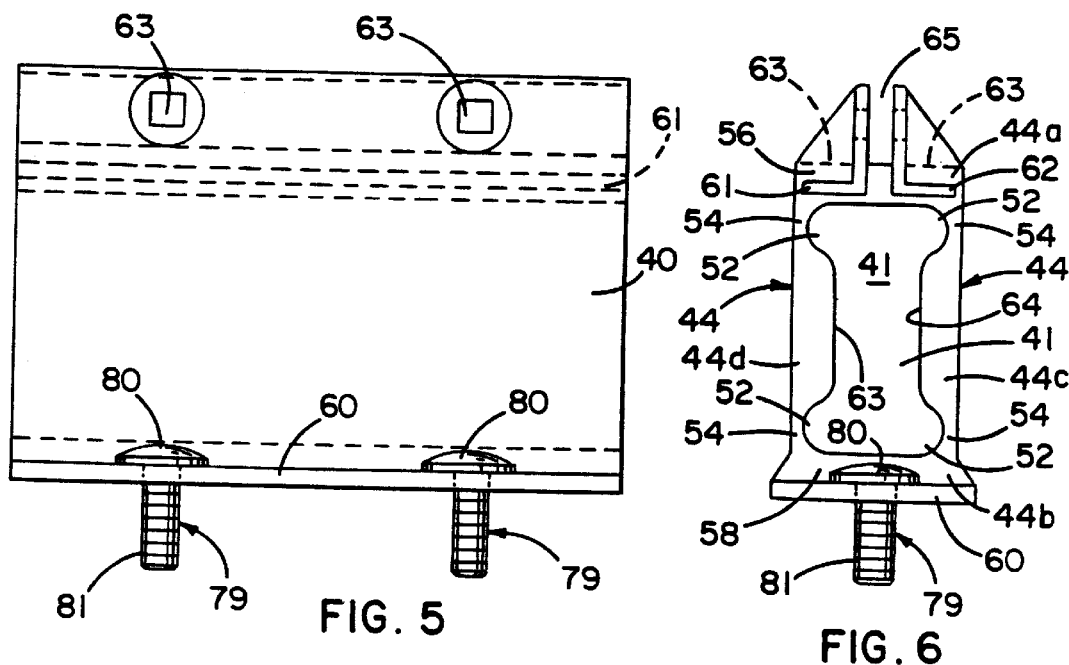
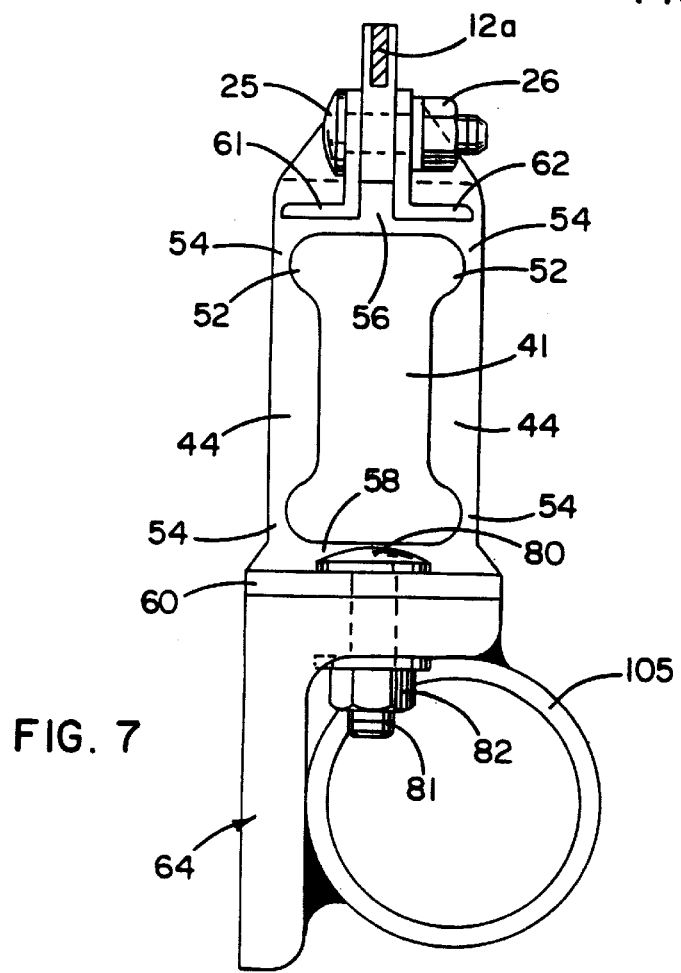

BELT CLEANER APPARATUS

This is a continuation of prior application No. PCT/US98/27290, filed Dec. 22, 1998, which designates the United States of America, which in turn claims priority to U.S. Provisional Patent Application No. 60/068,642, filed Dec. 23, 1997, which we hereby incorporate herein by reference in their entirety. The entire disclosure of the prior application is considered as being part of the disclosure of the accompanying application, and is hereby incorporated by reference herein.

FIELD OF THE INVENTION

This invention relates a cleaner apparatus for a conveyor belt to scrape material from the belt.

BACKGROUND OF THE INVENTION

The present invention is directed to providing a belt scraper which is relatively low in cost and simple in construction in comparison to many conventional belt scraper apparatuses. For example, one more complex belt scraper employs a closed parallelogram linkage of four links having an internal, inflatable diaphragm to bias the links and a belt scraper blade against the underside of a conveyor belt. Such a system is relatively complex in that it requires a source of compressed gas to inflate the diaphragm and protective flaps to deflect the scrap debris from clogging the parallelogram linkages. The parallelogram linkages comprise four pivotally connected, steel link members two of which are generally horizontal, and the other two of which are generally inclined to the vertical. As the belt wears the tip away, the diaphragm pushes the linkages to raise the blade tip to continue scraping pressure against the conveyor belt. It will be appreciated that wet material, dirt and clays or sands or gravel or other caustic materials being conveyed by the conveyor belt can deposit in or about the linkages and interfere with the operation of the linkages. Also, the initial cost of a particular linkage and the gas bag add to the cost and the maintenance problems associated with this particular system.

The present invention is also directed to providing a belt scraper that is usable with belts spliced with mechanical belt splices made of metal belt fasteners. These metal belt fasteners strike the belt scraper, unless a mechanism is provided to lower the belt scraper upon approach of the belt fasteners. The belt scraper's striking of the metal fasteners can damage the splice, gouge the scraper blade and vibrate the scraper blade and generate noise. There is a need for a more fastener-friendly belt scraper that allows downward travel of the scraper blades and a cushioning of the impacts between the belt scrapers and the metal belt fasteners.

Another form of belt scraper device, such as disclosed in U.S. Pat. No. 3,841,470, uses an elastomeric block of solid rubber or synthetic resin to mount the blade. The blade holder includes a vertical plate fixed to a vertical face of the block; and there is a mild elastic deformation of the resilient member to provide the biasing force. This system does not provide much cushioning because of its rigidity. Further, this system does not maintain the blade pressed against the belt with sufficient force with wear of the scraper blade so that frequent force adjustments are necessary. It is most desirable that blade pressure be maintained without frequent adjustments or other kinds of maintenance.

It will be appreciated that belt scrapers for conveyors are often exposed to ambient weather conditions which can be either very hot during summertime or very cold in wintertime. Preferably, the belt scraper functions adequately in very cold temperatures where ice and snow accumulations may be formed on the conveyor belts and scrapers in addition to the dirt, clay, sand, caustic materials, etc. that are always present. When exposed to high temperatures, the belt scraper materials and biasing force elements must not deteriorate and lose their effectiveness.

It has been found that the blade mounts and the blades of the scraper may experience a considerable amount of vibration over a particular time period and with a large amplitude of vibration caused by the blades impacting mechanical belt fasteners. It is desirable to reduce the duration and amplitude of the vibrations in an inexpensive manner. It is further desired to provide a scraper blade and mount that dampens the vibration of the blades, while in use, and thereby increases their life against failure due to fatigue of the materials used.

Also, there is a need for a scraper blade system for scraping the conveyor belt that allows the belt to be reversed in the opposite direction and still provide a scraping of the belt bottom surface. The scraper blade system should provide the requisite force or pressure between the scraping blade and the belt, even though the wear occurs, by shifting the blade upwardly to take up the wear and to maintain the scraping pressure to remove the debris from the belt.

SUMMARY OF THE INVENTION

In accordance with the present invention, there is provided a new and improved belt scraper apparatus having scraper blades each mounted on an elastomeric blade mount body having integral portions formed thereon for deflection to provide a cushioning of the blade and a spring biasing force to urge the blade tips against the belt surface being cleaned. Herein, this is achieved by an elastomeric blade mount body which is a block-shaped body having a flexible, central, elongated portion preferably including a pair of generally parallel legs or arms, which may be flexed as the scraper is forced against the belt with the legs trying to return to their original non-flexed positions as the scraper blade wears.

The preferred elastomeric body can be made relatively inexpensively by being formed as a one-piece block of elastomeric material. The particular opening therein is preferably I-shaped defining a pair of upper and lower horizontal legs attached to the pair of vertical legs at points that acts as flexure points. The preferred body acts as a parallelogram when deflected and acts as a cushion mounting for the scraper blade. The vertical legs may be bent and deformed substantially, e.g., in a range of 15°–40° with respect to the vertical; while the horizontal legs maintain the blade tip substantially perpendicular to the conveyor belt surface. The particular elastomeric blade mount body is relatively corrosion-resistant and a low maintenance item which needs neither to be greased nor, in the usual case, to be protected by flaps from dirt or other debris on the conveyor.

In the preferred embodiment of the invention, a filler material is inserted into and fills the opening while still allowing the legs or arms to deflect. The preferred filler material is a foamed material which fills the opening and seals the opening against the intrusion of dirt or other foreign materials. The preferred foamed material is a closed cell, rubber foam which dampens vibrations in the elastomeric body and thereby, decreases the fatiguing of the elastomeric body. Because the elastomeric body is filled and has little or no exposed metal, there is no corrosion and there is little dirt or ice build-up inside the cushion that could affect the deflection of the legs of the elastomeric body.

In accordance with the invention, the preferred elastomeric blade mount is made of and selected from various elastomeric materials to have the properties of a good fatigue life and a low compression set. The typical elastomerics have static compression sets in the range of about 20% to 40%; while the preferred elastomeric is a polyurethane having a lower static compression set of about 13%. This lower compression set material, while still providing good flexibility and cushion characteristics, serves to maintain a more constant pressure force between the blade surface and the conveyor belt, e.g., in the range of 10 to 20 lbs./inch$^2$. The low compression set elastomeric material increases the time between adjustments of the belt cleaner apparatus to keep the pressure contact within the desired range for good cleaning of the conveyor belt.

In accordance with another aspect of the invention, the blade mounts are mounted vertically on a lower, adjustable support which can be moved up, relative to the belt, to force the spring legs or arms of the mount against the belt with a high pressure. When the belt is moving at its normal speed, the friction force of the belt on the scraper blade will bend the vertical legs through an angle, e.g., 15°–20° to the vertical. These bent legs bias the blade with a pressure force against the belt of a predetermined amount usually in the range of 10–20 lbs./inch$^2$ of blade. Even though the bent legs may be inclined at 20° to the vertical by the traveling belt, the blade itself on the horizontal upper leg of the parallelogram remains perpendicular to the conveyor belt. The conveyor belt may be reversed in its travel direction, and the scraper will still function effectively.

When the scraper blade is struck by the belt fasteners, the legs are bent farther back than their usual bent position, and the deflection forces the blade and blade mount downwardly, e.g., about 0.125 inch in the downward direction. That bending of the legs is an energy-absorbing action that reduces the likelihood of gouging or fracturing of the scraper blade edge and damage to the belt fastener splice. Thus, the elastomeric body and bendable legs act as a cushion for the scraper blade.

BRIEF DESCRIPTION OF THE DRAWINGS

FIG. 2B is a view of the blade mount of FIG. 2A deflected and in a normal scraping position;

FIG. 2C is a view of the blade mount of FIG. 2B when further bent and displaced downwardly by a belt fastener;

FIG. 3 is a front elevational view of several scraper blades and a support mount therefor; and FIG. 4 is a side view of the support and blade mounts shown in FIG. 3;

FIG. 5 is a front elevational view of a scraper blade mount constructed in accordance with another embodiment of the invention;

FIG. 6 is a side view of the blade mount of FIG. 5;

FIG. 7 is an enlarged view of a scraper blade, blade mount of FIG. 6, and a support for the blade mount.

DETAILED DESCRIPTION OF THE PREFERRED EMBODIMENT

Figures 1, 2A:
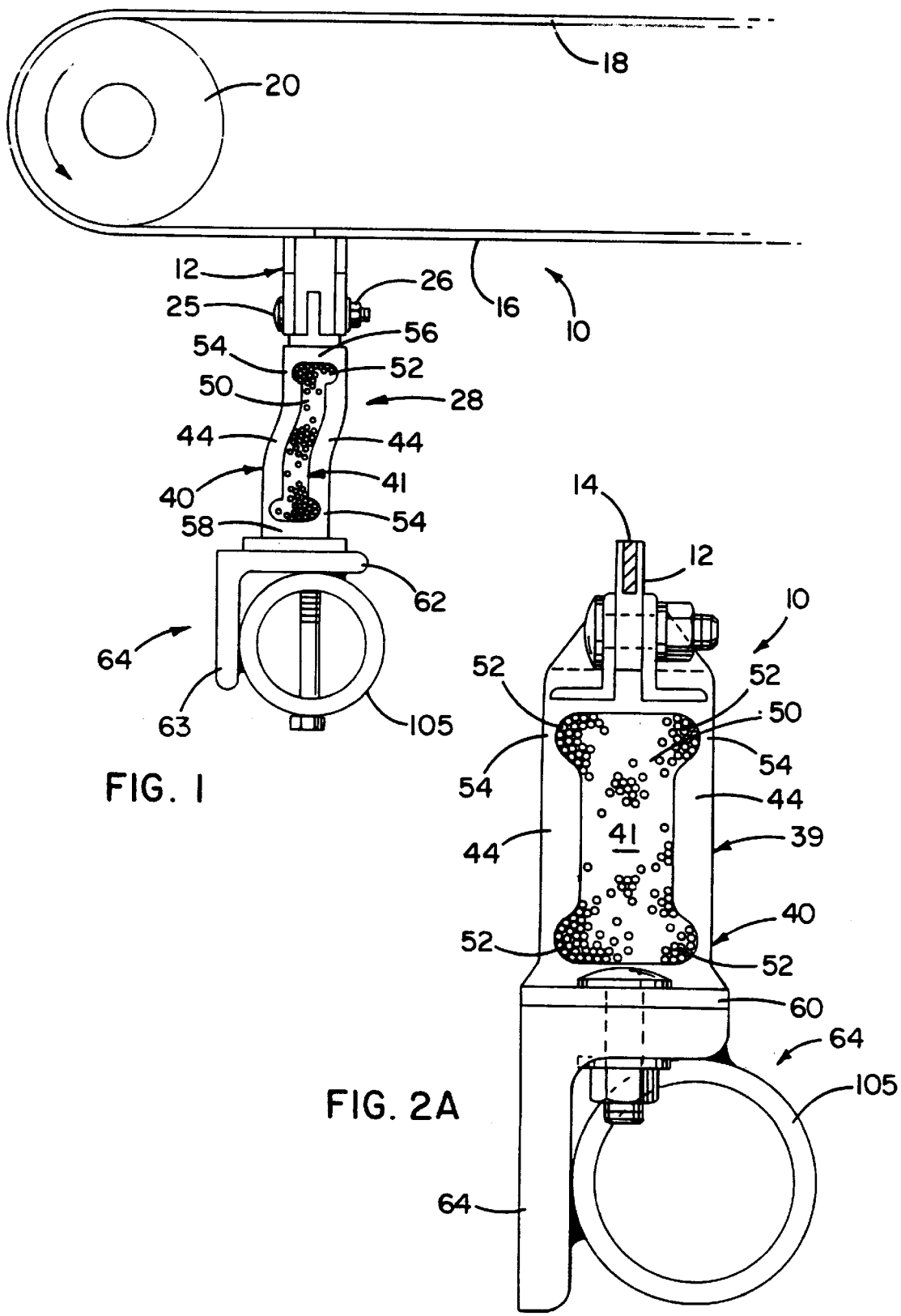
FIG. 1 is diagrammatic view of the scraper blade apparatus constructed in accordance with the preferred embodiment of the invention.
FIG. 2A is an end view of the scraper blade apparatus with the blade mount undeflected.

As shown in the drawings, for purposes of illustration, the invention is embodied in a belt cleaner apparatus 10 having a plurality of scraper blades 12 each having a blade tip 14 in scraping contact with an outer surface 16 of a conveyor belt 18. In the illustrated embodiment of the invention as shown in FIG. 1, the belt scraper blades 12 are shown just rearward of a head pulley 20. In other instances, the blades 12 may be positioned underneath the head pulley to push the belt directly against the head pulley 20, and this would be called a "head cleaner". Also, the present invention is applicable to cleaners located at various positions from those described herein.

Each of the scraper blades is mounted on an elastomeric blade mount having an elastomeric body 40 which is flexible and which is flexed upwardly against the belt by a support 64. The support 64, in the illustrated embodiment of the invention, is mounted between a pair of upstanding frames or rails 32 and extends across the conveyor belt in a transverse direction and comprises a pair of slidable slide blocks 34 (FIG. 4), which are movable vertically by an adjustable device such as a threaded adjustment screw 36. Other forms of vertical adjustments may be used rather than the screw assembly as shown herein.

In accordance with the present invention, there is provided a new and improved belt scraper apparatus having a plurality of scraper blades 12, each of which has an elastomeric body 40 having a flexible, elongated, central portion 39 which deflects to provide the spring biasing force to urge the blades 12 against the belt surfaces 16 with sufficient pressure to provide a good scraping action. In the preferred embodiment of the invention, the elastomeric body 40 is a block-shaped body having a central opening 41 being elongated in a vertical direction to provide a pair of generally parallel legs or arms 44 which may be flexed, as shown between the relaxed position of FIG. 2A and the flexed state of the legs 44 shown in FIGS. 1, 2B and 2C. The elastomeric blade mount body 41 may be made inexpensively by being a block of elastomeric material which is cut to size. The preferred elastomeric body has a generally rectangular cross-section for its central portion 39 which is located between an upper end 44$a$ and a bottom end 44$b$, and located between opposed sides 44$c$ and 44$d$. A number of elastomeric bodies are disposed side-by-side to make a long, composite scraper blade. To this end, the end walls 44$e$ of one elastomeric body may be butted against the adjacent endwall 44$f$ of the an adjacent elastomeric body, as best seen in FIG. 3.

The preferred elastomeric block-shaped bodies 40 are in the form of an elastomeric material, such as a silicon rubber or polyurethane, which is corrosion-resistant and is a low maintenance item because it does not need to be greased or protected by flaps as was the prior art devices from dirt or other debris being scraped from the conveyor. The preferred elastomeric bodies are one-piece, block-shaped bodies with smooth, vertical, outer walls 44$c$ and 44$d$ which do not readily retain material being scraped from the blades. The parallelogram vertical legs 44 will be vertical when the elastomeric body is allowed to relax (FIG. 2A) and to return to its original shape. In its preferred and illustrated form, the elastomeric body 4 has a central, I-shaped opening 41 with the elastomeric material surrounding the opening. Although the illustrated embodiment employs an opening in the elastomeric body and uses the resiliency of the elastomeric material to provide the self-energizing force to push the scraper blade tightly against the conveyor belt, it is possible to embed metal springs in the elastomeric body with the metal springs being deflected to provide the self-energizing force. That is, a low durometer, elastomeric body without a central opening can have metal, coiled springs with coiled flexure points at four corners of the body embedded therein to provide the parallelogram force and movement structure in a manner similar to that provided by the illustrated embodiment of the invention.

In accordance with another important aspect of the invention, each of the elastomeric bodies 40 is provided with a filler material 50 which is disposed within the opening 41 to fill the same to close the opening to the intrusion of dirt, ice or other debris which could fill it or accumulate within the block body and eventually affect the performance thereof. The preferred filler material 50 is also a dampening material or means which serves to reduce substantially the duration of any vibrations and to lower the amplitude of any vibrations occurring when the blades are vibrated, such as when in contact with belt fasteners or other devices on the belt. Preferably, the dampening material serves somewhat in a manner of a dampening dashpot or the like for the blades 14 and the bodies 40. A particularly good material is a foamed polymeric material, such as a low density, closed cell foam. The preferred foamed material is a closed cell rubber foam of 4–5 lbs./cu. ft. density, such as EMR#450 closed cell matallocene rubber available from Sentinel Company, located at Hyannis, Mass., United States of America. Thus, it will be understood that the foamed material 50 prevents accumulation of ice, dirt or other like from filling the hole 41; the foamed material does not interfere with the bending or deflection of the legs 44; and the foamed material serves as a dampening agent to increase the fatigue life of the elastomeric body.

In accordance with another important aspect of the invention, the shape of the preferred opening 41 includes an enlarged circular corner 52 at each of the four corners of the opening 41 to decrease the cross-sectional thickness of the block at the upper and lower ends of the legs to form reduced cross-sectional flexure joint sections 54. These sections 54 act as flexure points to centralize or locate the bending so as to form four legs to define a parallelogram with the upper, block portion 56 being an upper parallel leg, and the lower, block portion 58 being a lower, horizontal parallel leg. The corners also define opposite ends for the vertical legs 44 which are the vertical legs of the parallelogram.

The parallelogram is preferred in that it tends to maintain the blade 14 at the same scraping angle to the belt as the blade wears away. Herein, the blade angle is 90° (see FIGS. 2B and 2C), i.e., perpendicular to the belt surface 16 even though the blade mount is bent between the relaxed FIG. 1 position and the deflected position of FIG. 2B. Also, as the blades wear after considerable amount of scraping, the flexed legs 44 tend to push the scraper blade to maintain its same angular position with respect to the belt. The blade 14 could be positioned at a scraping angle other than the illustrated 90°, and the blade mount body 40 will maintain this angle as the blade tip wears. With the opening 41 in the illustrated elastomeric body, the legs 44 are equal in thickness and length and are deflected through equal angles. For example, in FIG. 2B, both of the legs 44 are illustrated as being bent at an angle A, which is a theoretical 20° to the vertical. When the belt fastener hits the blade, it exerts sufficient force to bend the legs 44 further, such as to the illustrated A' angle, which is at a theoretical 28°, with the blade tip and the cushion being displaced downward about 0.125 inch due to the projecting downward thickness of the belt fastener on the underside of the conveyor belt. This 20° angle and this 28° angle are given by way of example only, and they were attained by forcing the blade tips upwardly against the belt and exerting on the blade tips 14 an upward normal force of 40 to 50 lbs. while the belt is stationary.

Then, when the belt is running, the belt cleaner blade assumes the deflected position of 20° (shown in FIG. 2B) and exerts the desired scraping pressure. Herein, the scraping pressure is kept within a predetermined range to provide a good scraping action. In this illustrated example of the invention, a good scraping contact across the top of the blade surface with the belt is maintained with a scraping pressure in the range of 10 lbs. to 60 lbs. per square inch. The illustrated blade 14 is a metal blade that is about 6 inches in length and about 0.25 inch in width providing about 1.5 square inches of contact surface with the belt. If the blade 14 were made of urethane rather than metal, it would have about a 1.00 inch width and 6 square inches of surface contact.

When the blades 14 are all substantially vertically aligned perpendicular to the belt surface 16, it has been found that the scraper blades 14 work very well in both the forward or reverse travel directions of the conveyor belt. This is unlike many of the prior art constructions wherein the blades as well as the mounts were disposed at a considerable angle to the vertical.

By way of example only, the illustrated elastomeric body is a rectangular block of polyurethane, preferably a polyether urethane having a low compression set and good fatigue life. The preferred MD140 polyether urethane has a static compression set below 15%, such as about 13%, which is in contrast to the usual static compression sets of 20% to 40%. In the example given herein, about 40–50 lbs. of vertical force is applied constantly to the elastomeric body. If the elastomeric body had a compression set of 40%, the support would have to be adjusted much more frequently to maintain the desired pressure between the blade tip and the belt, as explained above, than would the preferred material having a static compression set of only 13%. The above-identified MD140 polyether urethane also has a good fatigue life and a hardness of about 86 on the A scale.

It will be appreciated that the conveyor belts are often run twenty-four (24) hours a day and seven (7) days a week at high speeds such as 650 ft./min. This results in quite frequent impacts by the belt fastener and/or other material on the belt against the scraper blade 14 causing vibrations in the elastomeric blade mont body 40. The filler material 50 serves to dampen these vibrations and thereby increases the fatigue life for the elastomeric material. Likewise, the filler material is also being subjected to these vibrations. The elastomeric body and filler act as a cushion and to limit the amount of deflection and to decrease the frequency of the vibrations. The dampening by the filler material serves to reduce the hysteresis effect and heat buildup in the elastomeric body.

Another possible elastomeric material is a silicone rubber having a shore A durometer in the range of 90 to 95. Silicon rubber is able to deflect readily over a large temperature range of about –200° F. to about 500° F.; and hence, it will work well in hot climates as well as cold climates. Another alternative elastomeric material is black rubber, which may also be used for the elastomeric body 40. The above-described, elastomeric materials for the body 40 behave like a rubber or a rubber-like material. The elastomeric material could be a rubber, a urethane or other plastic material that is sufficiently flexible and resilient to perform the functions for the mounting of scraper 12 to perform as described herein.

Figure 8:
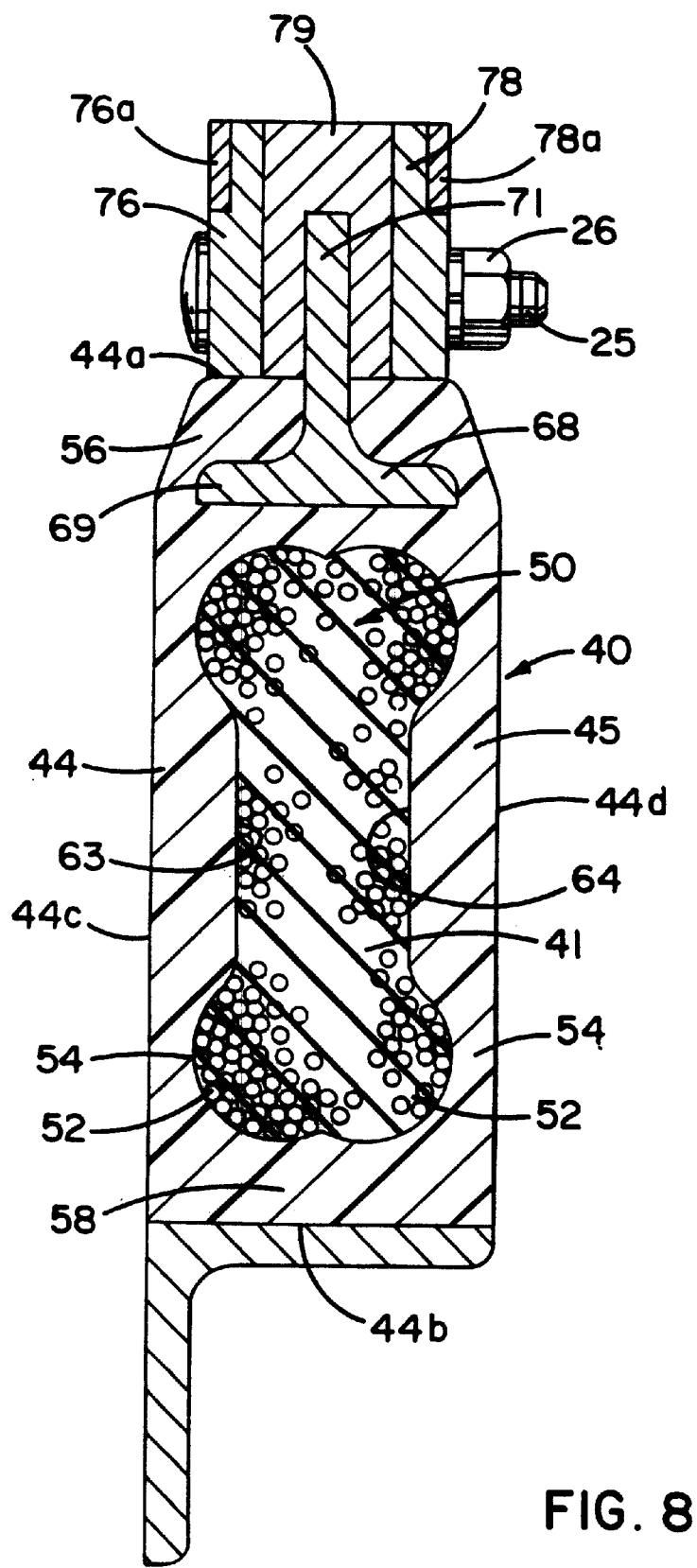
FIG. 8 is a cross-sectional view of a blade mount and a double scraper blade in accordance with a still further embodiment of the invention.

In the embodiment shown in FIG. 1, the elastomeric body includes a lower securing attachment or plate 60 of metal bonded or otherwise secured to the elastomeric body. To mount the blade 12 on the elastomeric body 40, a blade attachment may be molded, in situ, in the upper end of the elastomeric body, as best seen in FIGS. 5–7. More specifically, a pair of angle-shaped plates 61 and 62 is molded, in situ, within the elastomeric block 40 at the upper end of the body to provide the blade attachment device. A slot 65 (FIG. 6) is defined between the steel plates 61 and 62 to receive a scraper blade 12*a* (FIG. 7) therein. A bolt 25 extends through apertures 63 in the elastomeric body 40 in the upstanding webs of the metal angles 61 and 62 and through a hole in the blade disposed in the slot 65 with a nut threaded on the bolt to secure the blade to the elastomeric body. In another embodiment for the blade attachment, as shown in FIG. 8, a T-shaped, blade holder 68 has a lower, horizontal web 69 which is integrally molded, in situ, within the elastomeric body 40. A nut 26 and bolt 25 secure two blades, viz, a blade 76 and a blade 78 to an upstanding flange 71 of the T-shaped bracket.

Referring now to FIGS. 5–7, the lower securing attachment includes the plate 60 and a pair of bolts 79 with heads 80 of the bolts molded, in situ, in the elastomeric body 40 with threaded shanks 81 of the bolts extending down below the elastomeric body. Nuts 82 (FIG. 7) are threaded on the bolt shanks 81 to secure the blade mount and blade to the support 64.

The illustrated block body 40 has a height of about 4.13 inches and a thickness of about 1.65 inches. The illustrated block body extends about 6–8 inches in length. As shown in FIG. 2, while the opening 41 in the block body 40 may have various shapes and forms from that illustrated, the preferred shape is generally described as a I-shaped, which has a central portion of about ¾ inch between interior wall surfaces 63 and 64, which define the vertical sides of the opening 41. The illustrated height of the opening 41 is about 2.5 inches in height. The half of a cylindrically-shaped openings 52, which define the four flexure points 54, are about ¼ inch in radius defining a height of about ½ inch and a lateral extent of about a ¼ inch. The openings 52 and the vertical walls 63 and 64 are joined at curved areas 71 to eliminate sharp corners, where stresses could concentrate and cause a cracking of the elastomeric body and/or filler material therein. Manifestly, the particular dimensions or shapes of the openings and of the block bodies themselves, which need not be rectangular, may be varied substantially and still fall within the purview of the present invention.

The blade 12*c* disclosed in FIG. 8 is a double scraper blade 12*c* having a pair of opposed metal blades 76 and 78, each with a tungsten carbide insert plate 76*a* and 78*a*. The tungsten carbide inserts are very hard, wear-resistant plates which are seated in pockets in the metal blades 76 and 78. The blades 76 and 78 are preferably about one inch in height and about six inches in length. It is thought that use of two-spaced blades 76 and 78 with a urethane spacer 79 therebetween may space the blades to straddle a depression in the middle of the metal belt fasteners thereby keeping a scraper blade edge from dipping into the depression. In the FIG. 8 embodiment, a pair of metal blades of tool steel or the like are secured to an upstanding, T-shaped blade holder 78 having a lower horizontal web 69 and upstanding flange 71 of the blade holder by a nut 26 and bolt 25. A spacer block 79 of urethane, rubber or other elastomeric material may be secured by the nut 26 and bolt 25 to the blade holder.

The illustrated and described foamed, dampening material 50 is foamed within the opening 41 to completely fill the opening including the enlarged openings 52 at the four corners. However, a separate, preformed foamed sheet, which only substantially fills the body and does not fill all of the openings 52, could be used. The preformed foam strip should keep out ice and dirt or other materials that could interfere with the bending of the elastomeric body. It has been found preferable that the foam body foamed in the opening 41 serves best to perform the dampening functions to reduce the amplitude and/or frequency of the vibrations of the scraper blade.

Turning now to FIG. 4, the illustrated clamp block 34 is adjusted vertically by the adjustment device 36. The preferred and illustrated adjustment device 36 comprises a lower angle 90 which is secured by the rut and bolt fastener 92 to the parallel leg brace 32 on opposite sides of the conveyor belt. A horizontal leg 93 of the angle 90 is threaded and the adjustment device includes a pair of adjustment screws 94 at opposite sides of the conveyor belt which can be turned within the threaded leg 93 of the angle to push against a lower side 95 of a slide block 34. The slide block 34 is slidably mounted on a leg 32 for vertical movement.

The slide blocks 34 are guided for vertical sliding along a vertical side 32*a* of the frame rail 32 by pairs of threaded screws 97 having the threaded shanks 99 extending through a vertical, central slot 100 (FIG. 3) in the upstanding frame rail 32. When the screws 97 are loosened, the shanks of the screws slide in the slot 100 and guide the block 34 for travel vertically. The adjustment screws 94 are turned to push guide blocks 34 to raise the elastomeric body 40 and to push the scraper blade 12 tightly against the underside of the belt surface 16 with the desired force. Herein, the preferred blade pressure is in the range of about 10–60 lbs./inch$^2$ of blade surface, which, for a 6" blade, and this is generated using a vertical force of 15–90 lbs. for the metal blade that is about 0.25 inch thick.

Herein, the blades are pushed vertically against the underside of the belt initially with a force higher than the 15–90 lbs. of force per blade; and this higher force is reduced when the conveyor belt 18 starts to travel and deflects the blade mount body 40 to about 20° or so, which is the normal scraping angle for the blade mount while the conveyor belt is traveling.

The illustrated support assembly 30 has the illustrated guide blocks 34 and includes a central cylindrical member or pipe 105, which extends transversely across the belt. As best seen in FIG. 1, the pipe 105 has welded thereto the angle iron 64 with the upper leg of the angle iron being abutted against the top of the pipe 105; and with the other vertical leg 63 of the angle iron 64 being welded to a vertical side of the pipe 105.

The pipe 105 is releasably clamped to the sliding blocks 34 at its opposite ends where it is supported by the respective vertical frame rails 32. In this instance, the pipe 105 is mounted within a circular opening 34*c* in the sliding blocks, and the sliding blocks are each provided with an upper, split portion 34*a* and a lower split portion 34*b* which have an opening or space 34*c* between their respective facing surfaces. The portions 34*a* and 34*b* may be moved and forced against one another to clamp the pipe 105 by a threaded bolt 110, which has an upper head abutting the top surface of the portion 34*a* and a nut 111 abutting the bottom surface of the portion 34*b*. By tightening the nut 111 on the bolt 110, the portions 34*a* and 34*b* may be squeezed toward each other to clamp tightly about the pipe 105. It will be appreciated that the pipe 105 can be turned or rotated within the opening so as to assure that the position of the scraper blade 14 is in the desired position, which in this instance, is perpendicular to the belt surface 16. The adjustable guide blocks also allow removal of the cleaner from the conveyor for blade replacement.

Although the invention has been described with various preferred embodiments, it should be understood that various changes and modifications as would be obvious to one having the ordinary skill in this art may be made without departing from the scope of the invention which is defined in the appended claims.

What is claimed is:

1. A cleaner apparatus for scraping a conveyor belt comprising:

a support extending transversely to a direction of movement of the conveyor belt;

a plurality of belt scraper blades, each having a wearable material face for scraping material from the belt;

a plurality of elastomeric blade mounts disposed between the support and the scraper blades and supporting the scraper blades and forcing the scraper blades against the belt within a predetermined pressure range;

the blade mounts having an elastomeric body with an opening therein allowing deformation of the body to bias the scraper blades against the belt.

2. An apparatus in accordance with claim 1 wherein metal brackets are embedded into the elastomeric body, and the scraper blades are fastened to these embedded brackets.

3. An apparatus in accordance with claim 1 wherein a filler material is provided in the opening in the elastomeric body.

4. An apparatus in accordance with claim 3 wherein the filler material is a foamed, plastic which fills the opening to keep foreign material from entering the interior of the blades.

5. An apparatus in accordance with claim 3 wherein the blade is disposed to be substantially perpendicular to the belt and wherein the belt may be run in the forward or the reverse directions with the scraper blades being effective in either direction of belt travel.

6. An apparatus in accordance with claim 1 wherein the blade mount elastomeric body has a pair of substantially parallel, vertical legs on opposite sides of the opening, the opening being centrally disposed in the elastomeric body.

7. An apparatus in accordance with claim 6 wherein:

the support is vertically movable;

the blade and the blade mount are mounted for substantially vertical movement to determine the amount of deflection of the elastomeric body and the pressure force of the scraper blades against the belt; and the vertical legs of the elastomeric blade mounts bend through an angle of at least 15° to the vertical when deflected by the running belt.

8. An apparatus in accordance with claim 6 wherein the opening defines upper and lower, substantially horizontal legs which are attached to the vertically disposed legs to define a parallelogram therewith.

9. A cleaner apparatus in accordance with claim 8 wherein the elastomeric body is a substantial block-shaped body elongated in a vertical direction; and four corner sections of decreased cross-sectional thickness define hinge points for the parallelogram.

10. An apparatus in accordance with claim 9 wherein the opening has a dog-bone shape.

11. A cleaner apparatus for scraping a conveyor belt comprising:

a support extending transversely to direction of movement of the conveyor belt;

a plurality of belt scraper blades, each having a wearable material face for scraping material from the belt;

elastomeric blade mounts having an elastomeric body and being disposed between the support and the scraper blades and supporting the scraper blades and forcing the scraper blades against the belt within a predetermined pressure range;

a support sidewall on the elastomeric body mounted on the support;

a blade-carrying sidewall on the elastomeric body on a side opposite the support side of the elastomeric body; and a pair of substantially parallel lateral sidewalls extending between the support and blade-carrying sidewalls and being deformed and bending through an angle from an at-rest position to a deflected position with the blade mounts providing the self-energizing which causes the scraper blade force against the belt and providing cushioned support for the scraper blades.

12. An apparatus in accordance with claim 11 wherein the elastomeric body is molded; and a blade attachment is molded, in situ, in the elastomeric body for attaching the scraper blade to the elastomeric body.

13. An apparatus in accordance with claim 11 wherein the self-energizing, elastomeric body is applying force to the scraper blade to engage the belt at a pressure within the range of 10 lbs./in.$^2$ to 60 lbs./in.$^2$.

14. An apparatus in accordance with claim 11 wherein a filler material is provided in an opening in the elastomeric body to dampen vibrations of the elastomeric body.

15. An apparatus in accordance with claim 11 wherein the elastomeric body is formed of an elastomeric material having a compression set of less than 20%.

16. An apparatus in accordance with claim 15 wherein the compression set is about 13%.

17. An apparatus in accordance with claim 11 wherein the blade is set up to engage the belt at a predetermined angle when the belt is traveling and being scraped; and the self-energizing, elastomeric blade mount maintains the predetermined blade angle throughout substantially the entire life of the scraper blade.

18. An apparatus in accordance with claim 17 wherein the scraper blade is disposed to be substantially perpendicular to the belt and wherein the belt may be run in the forward or the reverse directions with the scraper blade being effective in either direction of belt travel.

19. An apparatus in accordance with claim 18 wherein metal brackets are embedded into the elastomeric body, and the scraper blades are fastened to these embedded brackets.

20. An apparatus in accordance with claim 11 wherein the blade mount elastomeric body has an opening in a central portion;

the pair of substantially parallel lateral sidewalls comprises a pair of vertical legs on opposite sides of the opening; and the opening being centrally disposed in the elastomeric body and providing a central portion with the decreased cross-section.

21. An apparatus in accordance with claim 20 wherein the opening in the elastomeric body is substantially I-shaped.

22. An apparatus in accordance with claim 20 wherein the opening defines the support sidewall and the blade-carrying sidewall as substantially horizontal legs which are attached to the vertically disposed legs to define a parallelogram therewith.

23. A cleaner apparatus in accordance with claim 22 wherein the elastomeric body is a substantial block-shaped body elongated in a vertical direction; and four corner sections of decreased cross-sectional thickness define flexure points for the parallelogram.

24. An apparatus in accordance with claim 20 wherein:

the support is vertically movable;

the blade and the blade mount are mounted for substantially vertical movement to determine the amount of deflection of the elastomeric body and the pressure force of the scraper blades against the belt; and the vertical legs of the elastomeric blade mounts bend through the same angle to the vertical when deflected by the running belt.

25. An apparatus in accordance with claim 24 wherein the legs are bent through an angle between about 15° to 20° to the vertical.

26. An apparatus in accordance with claim 20 wherein filler material comprises a foamed material fills the opening to keep foreign material from entering the interior of the blade mounts.

27. An apparatus in accordance with claim 26 wherein foamed material comprises a foamed elastomeric material.

28. An apparatus in accordance with claim 27 wherein the foamed, elastomeric material comprises a closed cell, rubber foam having a density in the range of about 4 lbs. to 5 lbs./cu. ft.

* * * * *

UNITED STATES PATENT AND TRADEMARK OFFICE
CERTIFICATE OF CORRECTION

PATENT NO. : 6,279,727 B1
DATED : August 28, 2001
INVENTOR(S) : Waalkes et al.

It is certified that error appears in the above-identified patent and that said Letters Patent is hereby corrected as shown below:

Column 9,
Line 62, after "transversely to", insert -- a --.

Column 10,
Line 54, change "the" to -- a --.

Column 12,
Line 1, change "20" to -- 14 --.
Line 1, after "wherein", insert -- the --.
Line 2, after "foamed material", insert -- which --.
Line 5, after "wherein", insert -- the --.

Signed and Sealed this

Tenth Day of September, 2002

Attest:

JAMES E. ROGAN
Attesting Officer
Director of the United States Patent and Trademark Office